US012693197B1

(12) United States Patent
Miesner et al.

(10) Patent No.: US 12,693,197 B1
(45) Date of Patent: Jul. 28, 2026

(54) AUTOMATED TEST HAMMER

(71) Applicant: The United States of America, as represented by the Secretary of the Navy, Arlington, VA (US)

(72) Inventors: John E. Miesner, Fairfax, VA (US); Matthew K. Willey, Boyds, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 281 days.

(21) Appl. No.: 18/650,154

(22) Filed: Apr. 30, 2024

(51) Int. Cl.
*G01N 3/317* (2006.01)

(52) U.S. Cl.
CPC ....... *G01N 3/317* (2013.01); *G01N 2203/005* (2013.01)

(58) Field of Classification Search
CPC .... G01N 3/317; G01N 2203/005; G01N 3/32; G01N 3/38
See application file for complete search history.

(56) References Cited

U.S. PATENT DOCUMENTS

| | | | |
|---|---|---|---|
| 7,404,334 B2 | 7/2008 | Saari | |
| 9,989,437 B2 | 6/2018 | Umehara | |
| 2014/0150526 A1* | 6/2014 | Powers ................ | G01N 29/045 |
| | | | 73/12.09 |
| 2023/0236100 A1* | 7/2023 | Sturm .................... | B06B 1/045 |
| | | | 73/12.12 |

FOREIGN PATENT DOCUMENTS

JP          2006317348 A  * 11/2006

* cited by examiner

*Primary Examiner* — Stephen D Meier
*Assistant Examiner* — Quang X Nguyen
(74) *Attorney, Agent, or Firm* — Jesus J. Hernandez; U.S. Department of the Navy, Office of the General Counsel

(57) ABSTRACT

Example embodiments provide an automated test hammer apparatus comprising an impact tip, a bottom plate, an enclosure, a top plate, an electronics cover, magnetic clamps attached to the bottom, an outer radial magnet ring polarized outward from the center, an inner radial magnet ring polarized outward from the center, an outer axial magnet ring polarized downward, and an inner axial magnet ring polarized upward. The automated test hammer apparatus may further comprise a back-iron that supports the magnets of the inner and outer rings and completes the magnetic circuit between them, a load cell connected to the impact tip and connected to the back-iron such that it transmits force from the back-iron to the impact tip, a bobbin, and a coil wound around the bobbin. The current through the coil may interact with the magnetic field of the magnets.

14 Claims, 7 Drawing Sheets

AUTOMATED TEST HAMMER

STATEMENT OF GOVERNMENT INTEREST

The following description was made in the performance of official duties by employees of the Department of the Navy. The claimed subject matter, encompassing various example embodiments, may be manufactured, used, licensed by or for the United States Government for governmental purposes without the payment of any royalties thereon. Potential licensees may contact the Technology Transfer Office, NAVSEA Naval Surface Warfare Center, Carderock Division, 9500 MacArthur Ave., West Bethesda, MD 20817, USA.

FIELD

The following description relates generally to automated test hammers.

BACKGROUND

Hand-held instrumented impact hammers may be commonly used in structural response testing. Repeated blows onto a defined test point with consistent intensity may be necessary for best test results. Consistent blows may be very difficult to achieve when the operator does not have an unobstructed hammer swing path or a convenient body position available. Testing may require at many as 100 blows with a consistent repetition rate, which is nearly impossible for an operator to achieve by manually swinging a hammer. The state of the art does not provide an automated test hammer capable of producing repeatable measured force pulses for structural response testing.

SUMMARY

Example embodiments provide an automated test hammer apparatus comprising an impact tip, a bottom plate, an enclosure, a top plate, an electronics cover, magnetic clamps attached to the bottom, an outer radial magnet ring polarized outward from the center, an inner radial magnet ring polarized outward from the center, an outer axial magnet ring polarized downward, and an inner axial magnet ring polarized upward. The automated test hammer apparatus may further comprise a back-iron that supports the magnets of the inner and outer rings and completes the magnetic circuit between them, a load cell connected to the impact tip and connected to the back-iron such that it transmits force from the back-iron to the impact tip, a bobbin, and a coil wound around the bobbin. The current through the coil may interact with the magnetic field of the magnets.

Other features and advantages of the invention will become apparent to those skilled in the art upon examination of the following or upon learning by practice of the invention.

BRIEF DESCRIPTION OF DRAWINGS

The accompanying figures are included to provide a further understanding of example embodiments, and are incorporated in and constitute part of this specification. In the figures:

FIG. 5 is an illustration of a finite element magnetic model of an automated test hammer, according to an example embodiment.

In the figures, the leading number of each element corresponds to the figure number in order to facilitate better exposition when discussing a feature in a particular example embodiment. Common features across different figures use the same subsequent digits to maintain consistency.

DETAILED DESCRIPTION

In the following description, for purposes of explanation and not limitation, specific details are set forth such as particular structures, designs, techniques, etc., in order to provide a thorough understanding of the example embodiments. However, it will be apparent to those skilled in the art that the disclosed subject matter may be practiced in other illustrative embodiments that depart from these specific details. In some instances, detailed descriptions of well-known elements and/or method are omitted so as not to obscure the description with unnecessary detail. All principles, aspects, and embodiments, as well as specific examples thereof, are intended to encompass both structural and functional equivalents of the disclosed subject matter. Additionally, it is intended that such equivalents include both currently known equivalents as well as equivalents developed in the future.

The following description refers to an automated test hammer apparatus. However, it should be noted that the example embodiments shown and described herein are meant to be illustrative only and not limiting in any way. As such, various modifications will be apparent to those skilled in the art for application to other fields based on technologies other than the above, which may be in various stages of development and intended for future replacement of, or use with, the above described method or apparatus.

The goal of example embodiments is to provide an automated test hammer capable of producing repeatable measured force pulses for structural response testing. Example embodiments provide an automated test hammer that may produce an impact force by a coil which resides in the magnetic field from a magnet assembly. For each impact, a time delay relay may trigger a power relay which discharges the energy stored in a capacitor through the coil. The resulting electrical current may interact with the magnetic field, causing an equal and opposite force in the magnets accelerating the magnet assembly until an attached impact tip strikes the test structure. A load cell may provide a force measurement output through a cable to a data collection system. The impact tip may be replaceable to allow tailoring of the impact pulse frequency content. The capacitor may recharge from an adjustable DC power supply and then the automated test hammer may be ready for the next pulse. This sequence may automatically continue indefinitely without operator action. The DC power supply may be an AC to DC power supply.

Figure 1A:
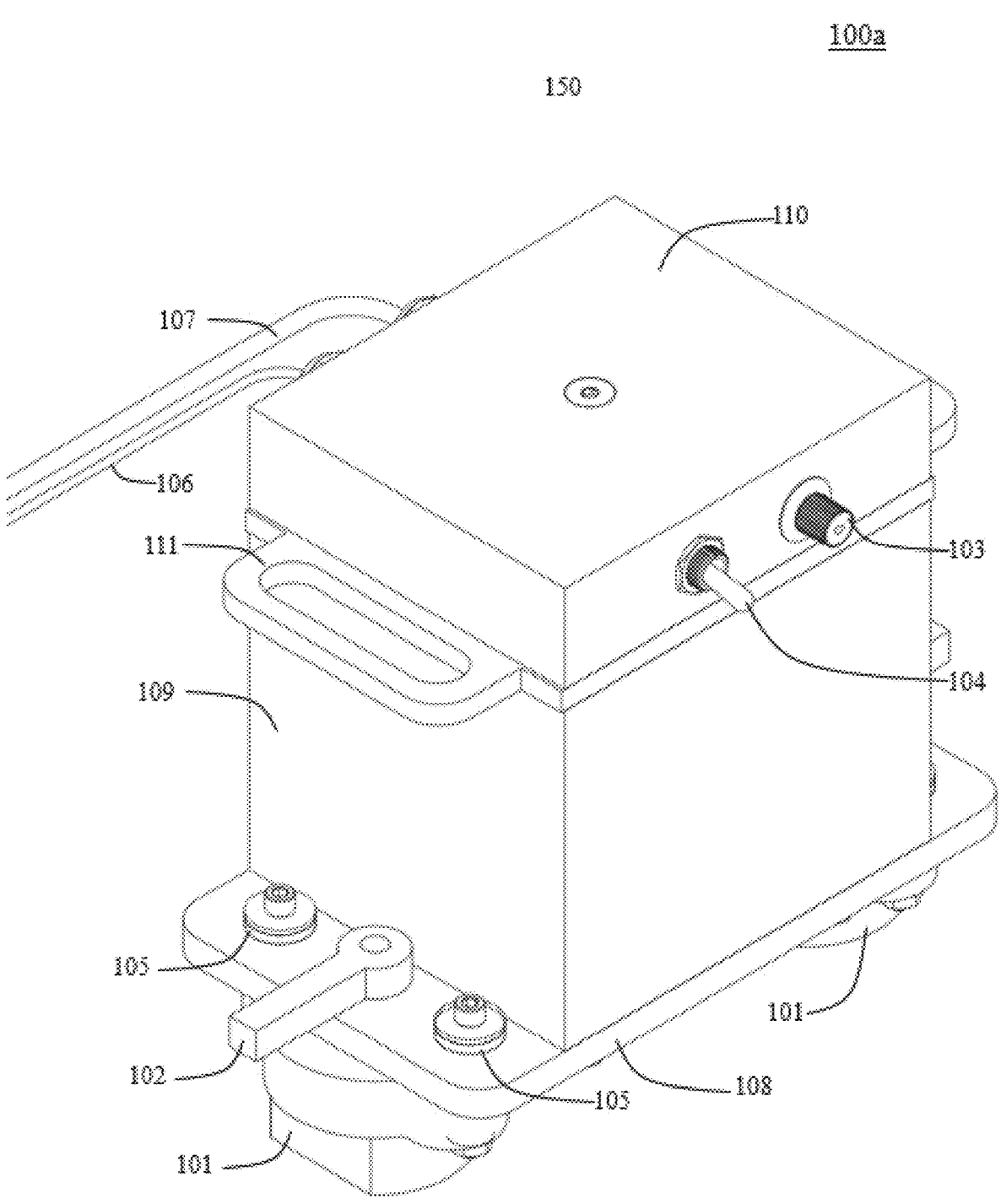
FIG. 1A is an overall view of an automated test hammer, according to an example embodiment.

FIG. 1A is an overall view 100a of an automated test hammer, according to an example embodiment. An automated test hammer 150 may be placed on a structure to be tested (not shown). Magnetic clamps 101 of the automated test hammer 150 may be in contact with a steel surface of the test structure. Magnet switch handles 102 may be rotated on magnetic clamps 101 which then produce a magnetic force between the automated test hammer 150 and the test structure. Repetition rate knob 103 may be rotated to the desired position and start switch 104 may be toggled to the on position. This configuration may start the impact sequence at the set repetition rate. Power cord 107 may provide alternating current to the automated test hammer 150. Load cell cable 106 may provide measured force to a separate data collection system.

The automated test hammer 150 may include a bottom plate 108, an enclosure 109, a top plate 111, and an electronics cover 110. Isolation washers 105 may be situated between the bottom plate 108 and the magnetic clamps 101. This configuration may allow small angular and positional relative motion to accommodate curved or irregular test structures and to reduce unwanted force transmission between bottom plate 108 and the test structure.

The magnetic clamps 101 may be of a type that use the relative position of internal permanent magnets to cancel the external magnetic field for one position of switch handle 102 and reinforce the external magnetic field for another position. Thus, rotation of switch handle 102 may effectively turn the attractive force on and off without a source of electrical power. Magnetic clamps 101 may have a force rating that supports the automated test hammer 150 in any orientation when attracted to the expected test structure. Magnetic clamps of this type may be of a conventional type, with force ratings of 300 N to 4000 N or more.

The bottom plate 108, the enclosure 109, the top plate 111, and the electronics cover 110 may be made of a lightweight material with high electrical conductivity such as aluminum. These components may be assembled in electrical contact without air gaps to completely enclose the internal components of automated test hammer 150 forming a Faraday shield to prevent external electromagnetic radiation. The isolation washers 105 may be made of natural or synthetic rubber.

Figure 1B:
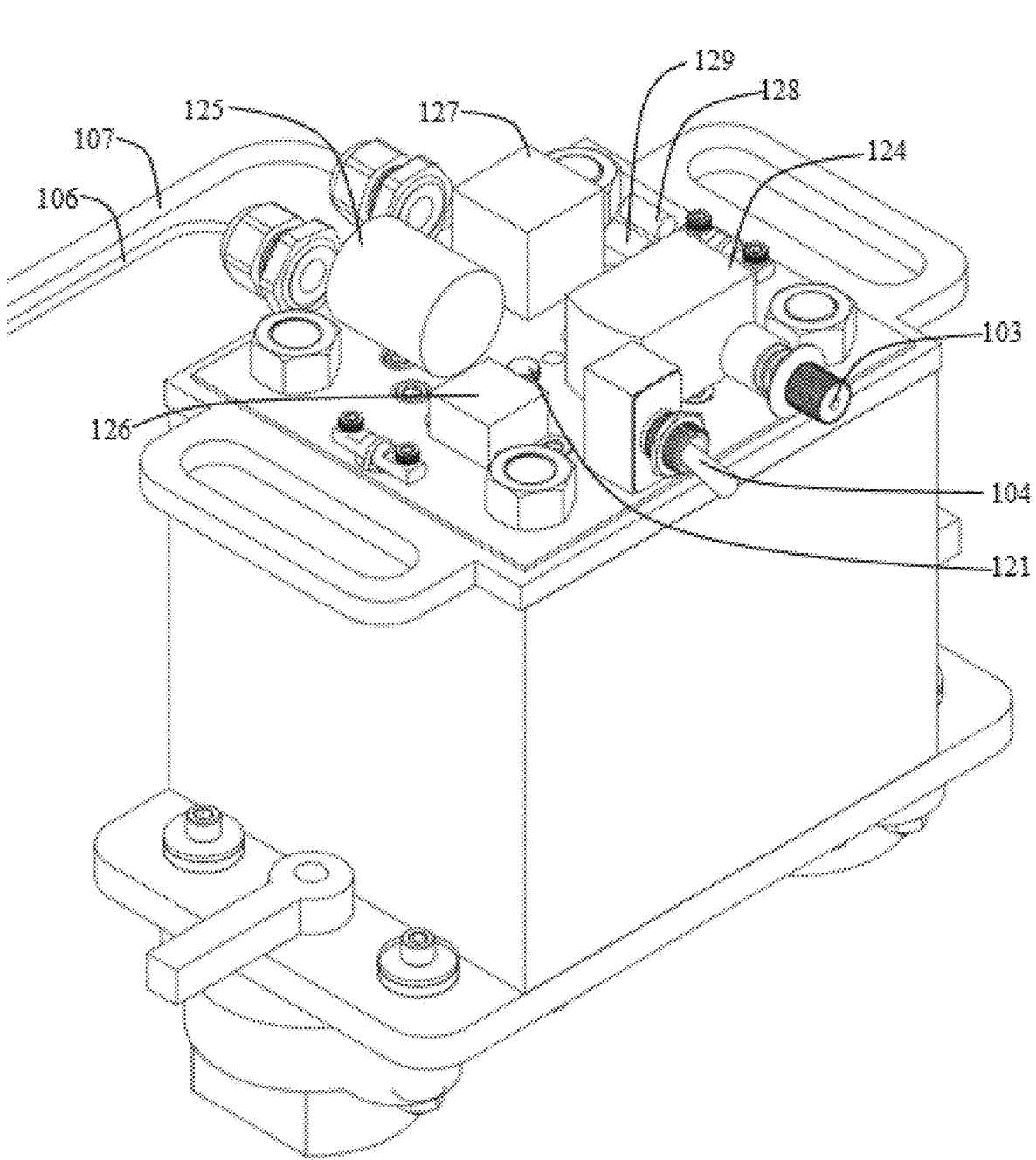
FIG. 1B is a view of an automated test hammer with the electronics cover removed, according to an example embodiment.

FIG. 1B is a view 100b of an automated test hammer with the electronics cover 110 removed, according to an example embodiment. The automated test hammer 150 without the electronics cover 110 depicts various electrical components. The various electrical components are exposed and in a configuration conforming to one example embodiment. Other configurations are possible.

View 100b again illustrates the repetition rate knob 103 and the start switch 104. Also depicted are the load cell cable 106 and the power cord 107 connected to the electrical components. The various electrical components exposed by the removal of the electronics hard cover 110 include a magnetic proximity switch 121, an adjustable DC power supply 124, a capacitor 125, a time delay relay 126, a power relay 127, a bleed resistor 128, and a fly back diode 129. Functionality of these elements is discussed further below.

Figure 2A:
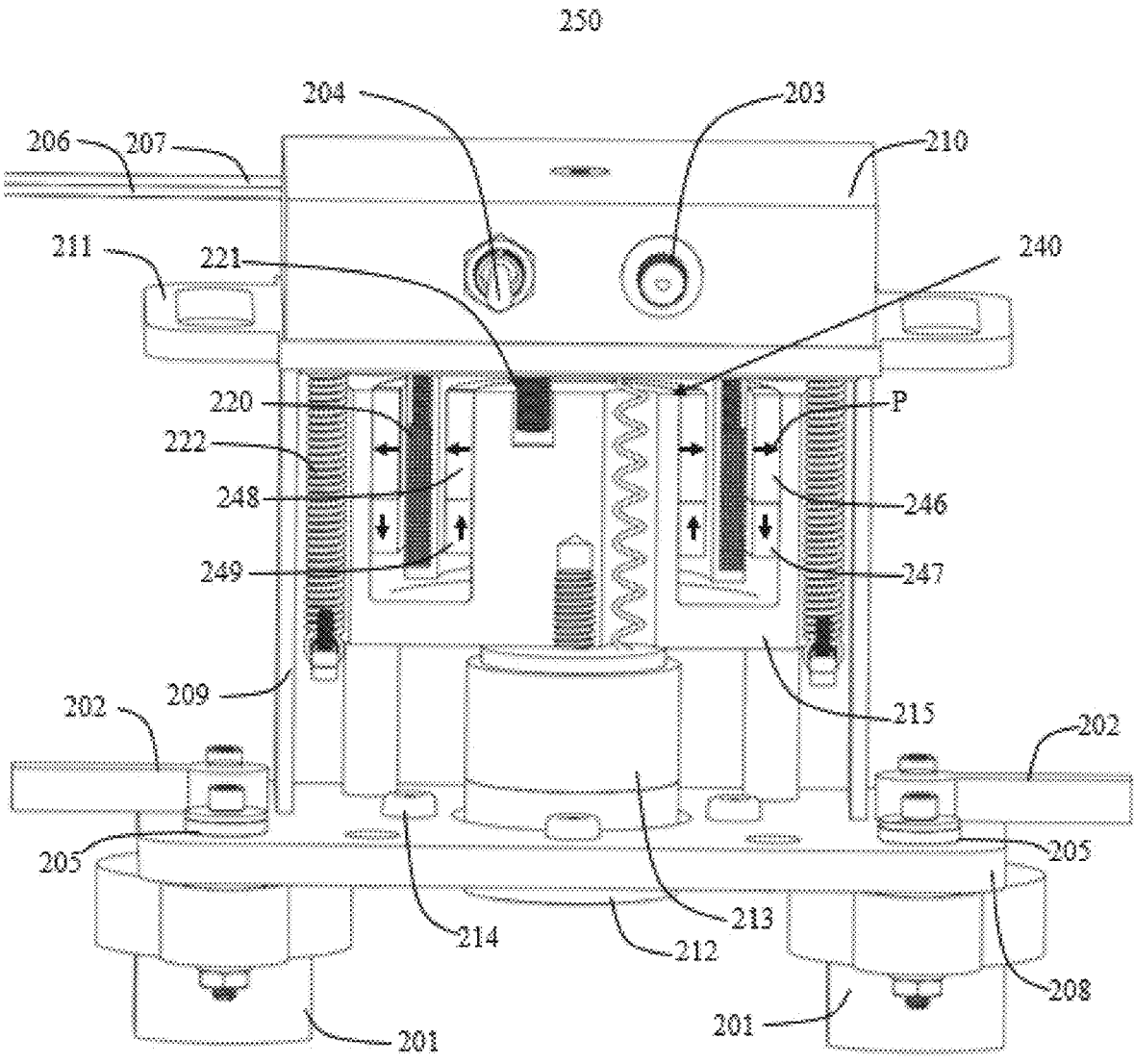
FIG. 2A is a cutaway view of an automated test hammer in the ready position, according to an example embodiment.

FIG. 2A is a cutaway view 200a of an automated test hammer in the ready position, according to an example embodiment. The cutaway view 200a depicts the ready position of an automated test hammer 250 at a first time interval.

The external surface of the automated test hammer 250 may comprise magnetic clamps 201, magnetic switch handles 202, repetition rate knob 203, and start switch 204. Also around the surface may be a bottom plate 208 with isolation washers 205, and an enclosure 209. The bottom plate 208 may also include rubber stops 214. The top of the automated test hammer 250 may have an electronics cover 210 housing various electrical components.

Impact tip 212 may be connected to a load cell 213. The load cell may be connected to back-iron 215. In some example embodiments, the impact tip 212 and the load cell 213 may be conventional products designed specifically for use in instrumented test hammers. The impact tip 213 may be made of rubber of a desired hardness. The impact tip 213 may be replaceable to allow tailoring of the impact pulse frequency content. The load cell 213 may measure a force passing through it to impact tip 212. The load cell 213 may provide the measured force through a load cell cable 206 and to an external data collection system. The external data collection system may also provide power to the load cell 213 through power cord 207. In alternative embodiments, the external data collection system may provide power via the load cell cable 206 instead of a dedicated power line, such as the power cord 207.

Various components of the automated test hammer 250 may make up a magnet assembly 240. The magnet assembly 240 may comprise the back-iron 215, outer radial magnet ring 246, outer axial magnet ring 247, inner radial magnet ring 248, inner axial magnet ring 249, the impact tip 212, and the load cell 213. The back-iron 215 may support the outer radial magnet ring 246, the outer axial magnet ring 247, the inner radial magnet ring 248, and the inner axial magnet ring 249. A polarization direction of each magnet ring is shown by the arrows labeled P. The magnet rings 246, 247, 248, 249 may collectively produce a radial magnetic field through a coil 220.

The coil may reside in the annular space between the inner ring magnets 248, 249 and the outer ring of magnets 246, 247. When current flows through the coil 220, the current may produce an upward axial force in the coil 220 by the Lorentz affect. An equal and opposite downward force may be produced in the magnet rings 246, 247, 248, 249 and may be transferred to the back-iron 215.

Return springs 222 may hold the magnet assembly 240 in position until the downward force is sufficient to overcome spring 222 preload at which point magnet assembly 240 moves downward. Normally open magnetic proximity switch 221 may be adjustably connected to a top plate 211 such that the distance that it extends into back iron 215 may be changed. With the magnet assembly 240 in the ready position as shown in FIG. 2A, there may be a magnetic field through proximity switch 221. The contacts of the proximity switch 221 may be in a closed position.

Figure 2B:
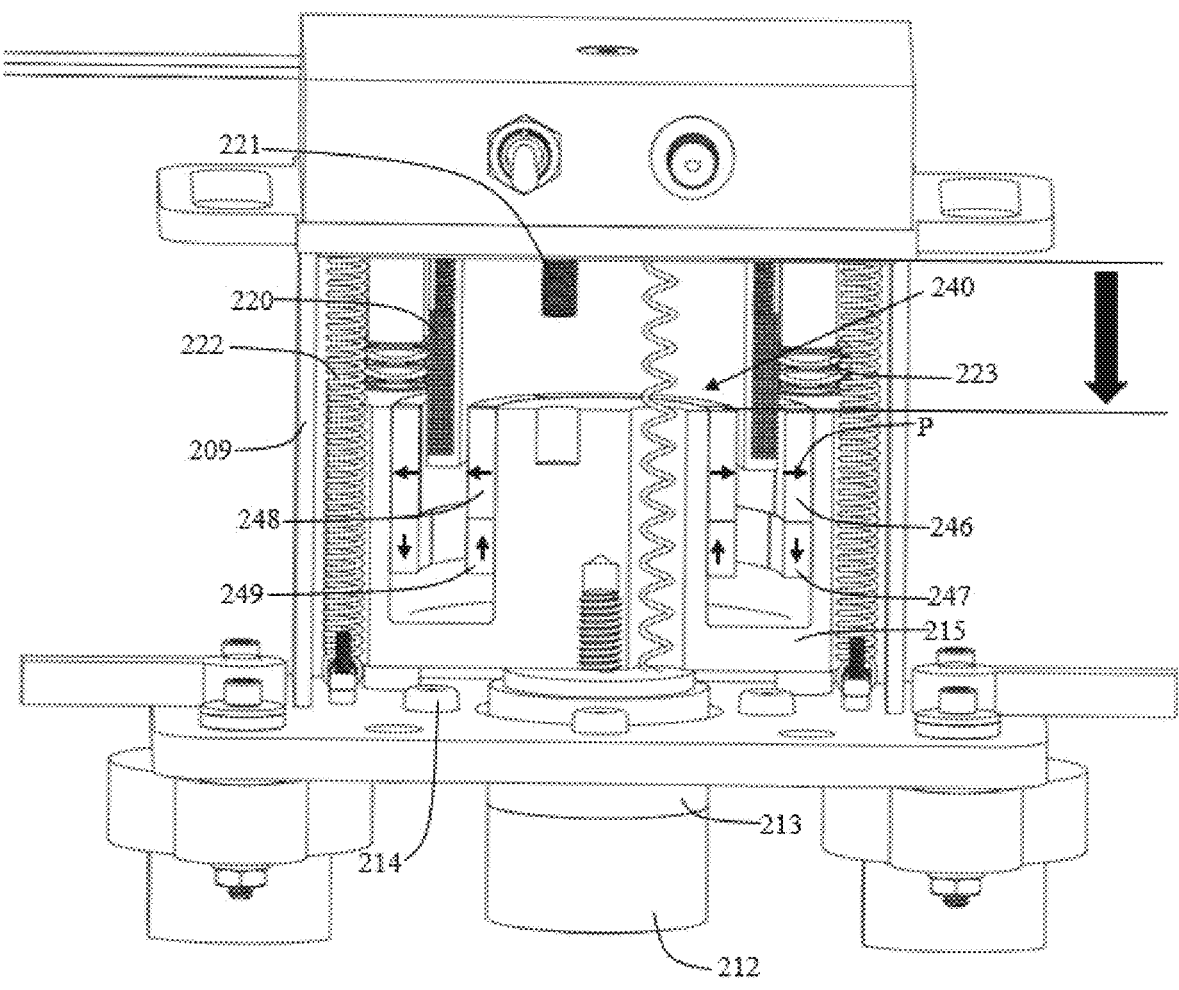
FIG. 2B is a cutaway view of an automated test hammer in the impact position, according to an example embodiment.

FIG. 2B is a cutaway view 200b of an automated test hammer in the impact position, according to an example embodiment. The cutaway view 200b depicts the impact position of an automated test hammer 250 at a second time interval when compared to FIG. 2A.

At the second time interval, magnet assembly 240 has moved downward, such that the impact tip 212 may be in contact with a test structure (not shown). When the impact tip 212 contacts the test structure, magnet assembly 240 may stop moving and its kinetic energy may be transferred to the test structure through impact tip 212. This may produce a force pulse which may be measured by the load cell 213. The magnitude and shape of the force pulse may depend upon the kinetic energy of the magnet assembly 240 at impact and the stiffness of impact tip 212. As previously stated, the magnet assembly 240 may comprise the back-iron 215, the outer radial magnet ring 246, the outer axial magnet ring 247, the inner radial magnet ring 248, the inner axial magnet ring 249, the impact tip 212, and the load cell 213

Total energy transferred to the test structure in the force pulse may be equal to the work done by the Lorentz force over the distance of travel minus losses in impact tip 212. For example, the coil 220 may be of a diameter of 0.08 m and have 350 turns when driven with a current of 30 amps. In such a configuration, the coil 220 may produce a peak force of 1200 N or more. With a stroke of 0.03 m, the energy at impact may be 30 J or more. The impact tip 212 may be replaceable and is selected based on the peak force pulse desired and the frequency content desired.

When automated test hammer 250 is in the impact position, the magnetic proximity switch 221 may be out of the magnetic field and its contacts may be open. The return spring 222 is now fully extended and may provide an upward force to return magnet assembly 240 to its ready position. Rubber stops 214 may provide an alternate impact surface if automated test hammer 250 is not attached to the test structure. Bumper springs 223 may bring magnet assembly 240 to a gradual stop at the ready position. The bumper springs 223 are visible in the cutaway view 200b while the automated test hammer 250 is in an impact position.

Figure 3:
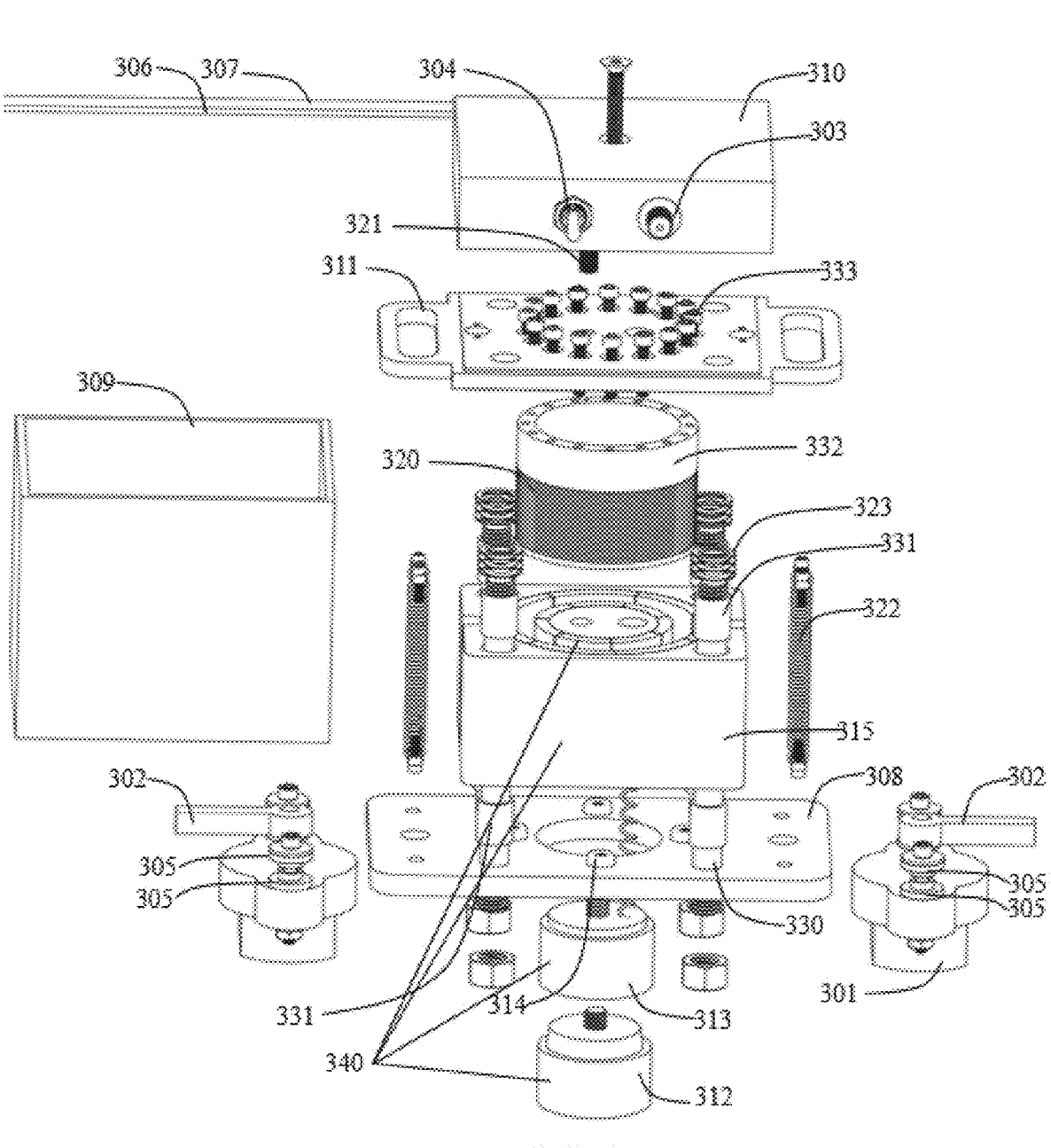
FIG. 3 is an exploded view of an automated test hammer, according to an example embodiment.

FIG. 3 is an exploded view 300 of an automated test hammer, according to an example embodiment. The components of the automated test hammer 350 may be divided into top components, bottom components, and middle components. The middle components are mainly housed within an enclosure 309.

The top components of the automated test hammer 350 may comprise a load cell cable 306, a power cord 307, an electronics cover 310, repetition rate knob 303, and start switch 304. Protruding from the electronics cover 310 may be a magnetic proximity switch 321. At the base of the electronics cover 310 may be a top plate 311 and a plurality of heat conducting bolts 333. In this example embodiment, there may be sixteen of the heat conducting bolts 333.

The bottom components of the automated test hammer 350 may comprise magnetic clamps 301, magnetic switch handles 302, and a bottom plate 308 with isolation washers 305. The bottom plate 308 may also include rubber stops 314. Connected to the bottom plate 308 may be shafts 330 and top and bottom low friction bearings 331.

The middle components of the automated test hammer 350 may mostly reside within the enclosure 309. This may include a magnet assembly 340, a return spring 322, bumper springs 323, and a bobbin 332. The magnet assembly 340 may comprise a back-iron 315, an impact tip 312, a load cell 313, and magnet rings (as discussed in previous FIGS.).

In terms of the operation of all the components of the automated test hammer 350, the back-iron 315 may be slidably mounted to the shafts 330 by the top and bottom low friction bearings 331. The coil 320 may be wound onto bobbin 332. The bobbin 332 may be attached to top plate 311 by heat conducting bolts 333 which may pass through the bobbin 332 to contact the coil 320.

The coil 320 may be made of enameled copper wire, known as magnet wire. The bobbin 332 may be made of a high strength, nonconducting, non-magnetic material such as polyether ether ketone (PEEK). These materials typically have low thermal conductivity of about 0.25 W/(m·K) which may cause the coil 320 to overheat during prolonged usage. The heat conducting bolts 333 may be made out of high thermal conductivity material such as aluminum with a conductivity of over 200 W/(m·K). The heat conducting bolts 333 may increase the overall heat transfer from coil 320 to top plate 311 by a factor of 100 or more compared to PEEK alone.

Figure 4:
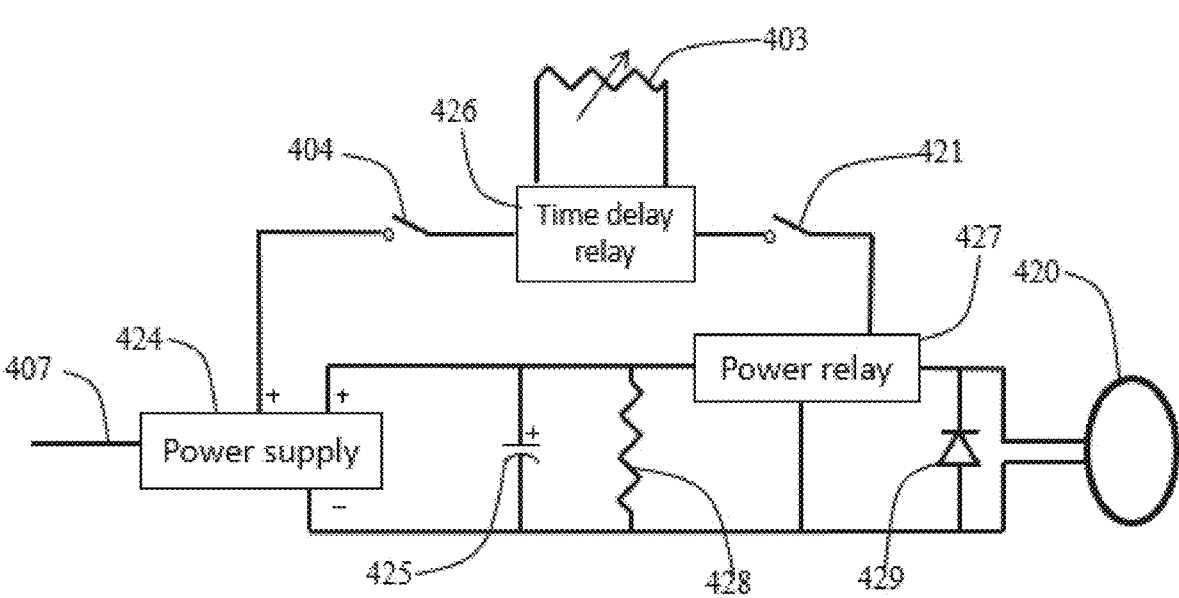
FIG. 4 is a diagram of a simplified circuit illustrating electrical components and wiring connections of an automated test hammer, according to an example embodiment.

FIG. 4 is a diagram 400 of a simplified circuit illustrating electrical components and wiring connections of an automated test hammer, according to an example embodiment. The simplified circuit 451 may comprise a repetition rate knob 403, a start switch 404, a cable 407, a coil 420, a magnetic proximity switch 421, an adjustable DC power supply 424, a capacitor 425, a time delay relay 426, a power relay 427, a bleed resistor 428, and a fly back diode 429.

In the simplified circuit 451, alternating current power may be supplied through the cable 407 to adjustable the DC power supply 424. The DC power supply 424 may supply direct current voltage to charge capacitor 425. The bleed resistor 428 may be connected in parallel with capacitor 425. The bleed resistor 428 may allow a small current flow to gradually discharge the capacitor 425 for personnel safety when the power source is turned off.

The adjustable DC power supply 424 may provide a voltage to start switch 404. The start switch 404 may normally be in an open state. When an operator toggles start switch 404 to the closed position, voltage may be applied to time delay relay 426. The time delay relay 426 may have a variable time delay from voltage applied to contact close. A time delay may be set by the repetition rate knob 403.

After the set delay, the time delay relay 426 contacts may close and apply a voltage to magnetic proximity switch 421. If the automated test hammer is in the ready position, proximity switch 421 contacts are closed and voltage may be applied to the power relay 427.

The power relay 427 may conduct in order to discharge capacitor 425 through the coil 420. Current flowing through the coil 420 produces a force by the Lorentz affect causing a magnet assembly to move downward. An impact tip of the magnet assembly then may strike a test structure as previously described.

As the magnet assembly moves downward, the magnetic field in proximity switch 421 may decrease until the contacts open, de-energizing the power relay 427 and stopping current flow through it. The fly back diode 429 may also be in parallel with coil 420. The fly back diode 429 may allow current to continue flowing through coil 420 until the inductively stored energy is dissipated to reduce the voltage surge on power relay 427.

When current stops flowing through coil 420, the Lorentz force production may stop and the return springs may return the magnet assembly to the ready position. At the ready position, the magnetic proximity switch 421 contacts are closed. The power supply 424 may recharge capacitor 425 to allow the automated test hammer to be ready for the next pulse cycle. The cycle repeats as long as start switch 404 contacts are closed.

The impact energy that an automated test hammer provides to a test structure may be limited by the energy stored in capacitor 425. This parameter is a product of the capacitance of the capacitor 425 and the voltage provided by power supply 424. Therefore, the voltage of power supply 424 may be adjusted to change the impact energy and, by extension, the force pulse magnitude.

The changing the position of the magnetic proximity switch 421, which is normally open, changes the distance that the magnet assembly moves downward before the proximity switch 421 contacts open, turning off the power relay 427 and stopping current flow through the coil 420. The highest impact force may be obtained when the current is turned off just before impact which may allow the magnet assembly to be accelerated for its entire downward stroke while also allowing immediate return to the ready position after the impact occurs.

Figure 5:
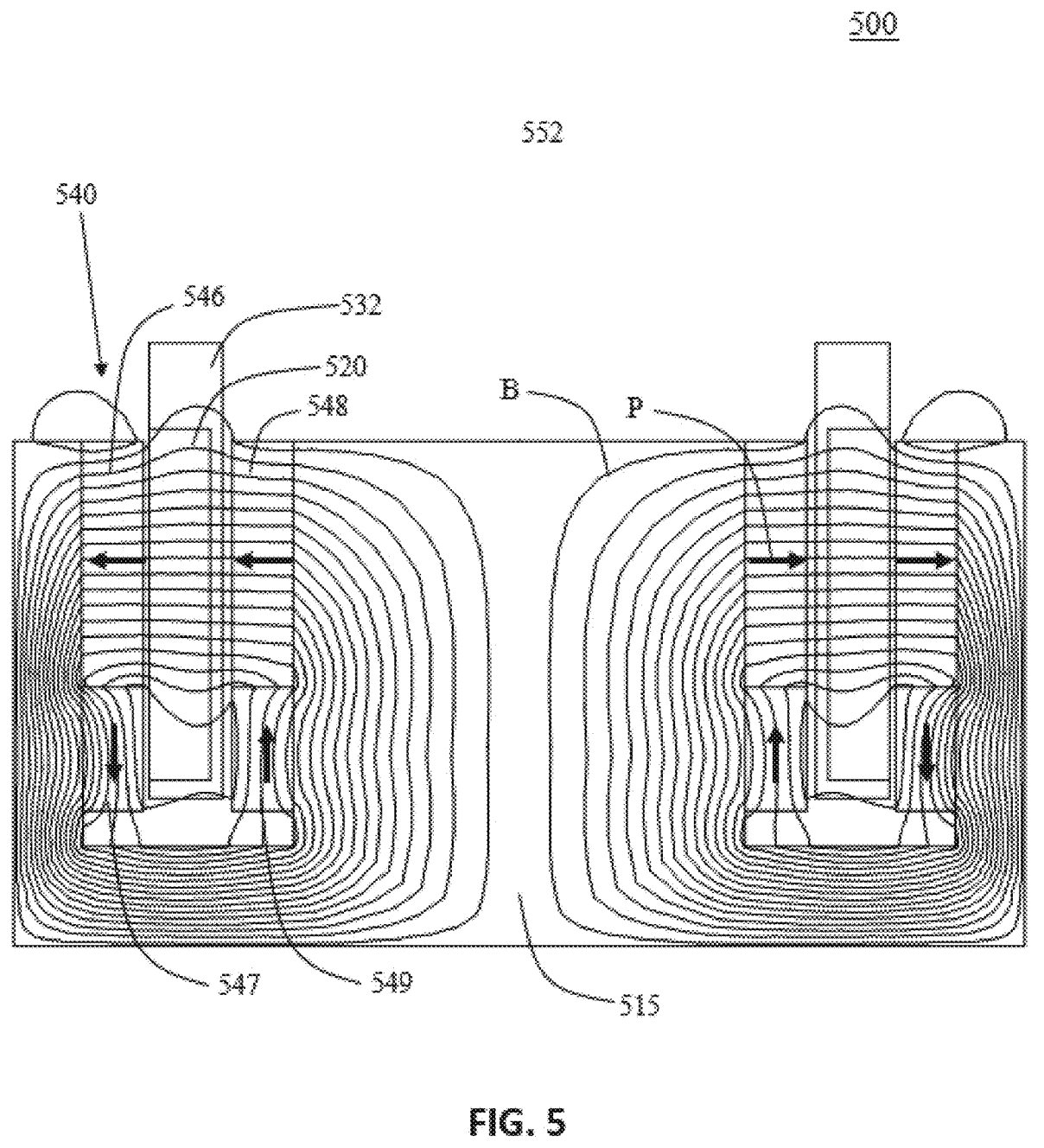

FIG. 5 is an illustration 500 of a finite element magnetic model of an automated test hammer, according to an example embodiment. Illustration 500 focuses on a bobbin 532 and a back iron support 515.

The back-iron 515 may support outer radial magnet ring 546, outer axial magnet ring 547, inner radial magnet ring 548, and outer axial magnet ring 549. The back-iron 515, the outer radial magnet ring 546, the outer axial magnet ring 547, the inner radial magnet ring 548, and the outer axial magnet ring 549 are components of a magnet assembly 540, alongside other components, like an impact tip and a load cell (not shown).

In illustration 500, magnetic flux lines are labeled B. The back-iron 515 may conduct flux from the magnets in complete loops that pass through a coil 520. The polarization direction of each magnet ring is shown by the arrows labeled P. As shown, outer radial magnet ring 546 and inner radial magnet ring 548 are polarized outward while outer axial magnet ring 547 is polarized downward and inner axial magnet ring 549 is polarized upward. In alternative example embodiments, the polarization may be at opposite directions.

The combination of radially and axially polarized magnets may form a partial Halbach array in which the magnet rings 546, 547, 548, 549 may reduce the amount of magnetic flux that is conducted by back-iron 515. This configuration may also prevent magnetic saturation, which would reduce the magnet flux through coil 520.

The magnetic field through coil 520 may be 0.6 Tesla or more. The magnet rings 546, 547, 548, 549 may be made of high strength magnetic material such as Neodymium Iron Boron (NdFeB). The back-iron 515 may be made of a material with high permeability, such as steel, to provide a low reluctance path for the magnetic flux.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. An automated test hammer apparatus, comprising:
an impact tip;
a bottom plate;
an enclosure;
a top plate;
an electronics cover;
magnetic clamps attached to the bottom plate such that they hold the bottom plate in position relative to a structure under test;
a group of magnets comprising:
an outer radial magnet ring polarized outward from the center,
an inner radial magnet ring polarized outward from the center,
an outer axial magnet ring polarized downward,
an inner axial magnet ring polarized upward;
a back-iron that supports the outer radial magnet ring, the inner radial magnet ring, the outer axial magnet ring, and the inner axial magnet ring, the back-iron completing the magnetic circuit between them;
a load cell connected to the impact tip and connected to the back-iron such that it transmits force from the back-iron to the impact tip;

shafts supported by the bottom plate and top plate;
linear bearings that slidably mount the back-iron to the shafts;
springs between the back-iron and the top plate;
a bobbin;
a coil wound around the bobbin residing in the annular space between inner rings and outer rings of the group of magnets; and
wherein current through the coil interacts with the magnetic field of the group of magnets creating an axial force by a Lorentz effect accelerating downward the back-iron, the outer radial magnet ring, the inner radial magnet ring, the outer axial magnet ring, the inner axial magnet ring, the load cell, and the impact tip.

2. The automated test hammer apparatus of claim 1, wherein impact of the impact tip against the structure under test creates a force pulse which is transmitted through the load cell and then to the structure under test, and wherein the load cell provides a measurement of the force pulse to an external data collection system.

3. The automated test hammer apparatus of claim 2, further comprising:
a power supply;
a capacitor;
a time delay relay;
a power relay;
a magnetic proximity switch; and
a start switch;
wherein the power supply applies DC voltage to the capacitor storing energy;
wherein toggling the start switch to the closed position applies DC voltage from the power supply to the time delay relay;
wherein, after a set time delay, the time delay relay starts to apply the DC voltage to the magnetic proximity switch;
wherein the magnetic proximity switch contacts are closed if it is in the magnetic field of the back-iron;
wherein the magnetic proximity switch applies the DC voltage from the start switch to the power relay if its contacts are closed.

4. The automated test hammer apparatus of claim 3, wherein when the power relay receives the DC voltage it conducts current from the capacitor to the coil, discharging the stored energy into the coil;
wherein the magnetic proximity switch contacts open when it is no longer in the magnetic field of the back-iron removing voltage from the power relay, thereby stopping current flow through the coil;
wherein stopping current flow through the coil stops the Lorentz force production in the coil;
wherein the springs between the back-iron and the top plate return the back-iron and connected components to a ready position when coil force production stops; and
wherein the capacitor discharge and force production cycle repeats automatically as long as the start switch contacts are closed.

5. The automated test hammer apparatus of claim 4, further comprising:
isolation washers between the bottom plate and magnetic clamps;
wherein the isolation washers allow small angular and positional relative motion to accommodate the structure under test when curved or irregular to reduce unwanted force transmission between the bottom plate and the test structure.

6. The automated test hammer apparatus of claim 4, further comprising:

a bleed resistor in parallel with the capacitor;

wherein the bleed resistor gradually discharges the capacitor for personnel safety when the power source is turned off.

7. The automated test hammer apparatus of claim 4, further comprising:

a flyback diode in parallel with the coil;

wherein the flyback diode allows current to continue flowing through the coil until an inductively stored energy is dissipated to reduce a voltage surge on the power relay.

8. The automated test hammer apparatus of claim 4, wherein the power supply is adjustable to vary the energy stored in the capacitor and thereby the magnitude of the force pulse.

9. The automated test hammer apparatus of claim 4, wherein the time delay relay is adjustable to vary the force pulse repetition rate.

10. The automated test hammer apparatus of claim 4, wherein the magnetic proximity switch is adjustable such that a distance that it extends into the back iron may be changed to vary when the power relay is turned off to stop current flow, such that the current is turned off just before impact.

11. The automated test hammer apparatus of claim 2, further comprising:

heat conducting bolts which pass through the bobbin to contact the coil and which attach the bobbin to the top plate;

wherein the heat conducting bolts transfer heat from the coil to the top plate.

12. The automated test hammer apparatus of claim 2, further comprising:

bumper springs between the back-iron and top plate;

wherein the bumper spring bring the back-iron to a gradual stop at the ready position.

13. The automated test hammer apparatus of claim 2, wherein the impact tip is replaceable to allow tailoring of the impact pulse frequency content.

14. The automated test hammer apparatus of claim 2, wherein the bottom plate, the enclosure, the top plate, and the electronics cover form a Faraday shield to prevent external electromagnetic radiation.

\* \* \* \* \*